(12) United States Patent
Damink et al.

(10) Patent No.: US 8,174,683 B2
(45) Date of Patent: May 8, 2012

(54) VEHICLE POSITIONING MEASUREMENT SYSTEM AND METHOD

(75) Inventors: Paulus Henricus Antonius Damink, Eindhoven (NL); Sel Brian Colak, Eindhoven (NL); Cornelis Reinder Ronda, Aachen (DE); Lorenzo Feri, Eindhoven (NL); Tim Corneel Wilhelmus Schenk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 134 days.

(21) Appl. No.: 12/670,440

(22) PCT Filed: Jul. 24, 2008

(86) PCT No.: PCT/IB2008/052966
§ 371 (c)(1),
(2), (4) Date: Jun. 29, 2010

(87) PCT Pub. No.: WO2009/016551
PCT Pub. Date: Feb. 5, 2009

(65) Prior Publication Data
US 2010/0271617 A1  Oct. 28, 2010

(30) Foreign Application Priority Data
Aug. 1, 2007  (EP) .................................. 07113581

(51) Int. Cl.
*G01C 3/08* (2006.01)
(52) U.S. Cl. ..................................... 356/5.09
(58) Field of Classification Search .................. 356/5.01
See application file for complete search history.

(56) References Cited

U.S. PATENT DOCUMENTS

| | | | | |
|---|---|---|---|---|
| 4,818,887 A | * | 4/1989 | Weishaupt et al. | 250/559.38 |
| 5,026,153 A | | 6/1991 | Suzuki et al. | |
| 5,039,217 A | | 8/1991 | Maekawa et al. | |
| 5,504,480 A | * | 4/1996 | Bourbin | 340/903 |
| 5,568,136 A | | 10/1996 | Hochstein et al. | |
| 5,717,484 A | * | 2/1998 | Hamaguchi et al. | 356/3.12 |
| 5,754,123 A | * | 5/1998 | Nashif et al. | 340/903 |

(Continued)

FOREIGN PATENT DOCUMENTS
EP  0961134 A1  12/1999
(Continued)

*Primary Examiner* — Thomas Tarcza
*Assistant Examiner* — Antoine J Bedard

(57) ABSTRACT

A vehicle position measurement system (100) and method to determine the (relative) position of a vehicle (110) and an object (120) are proposed. The system comprises at least two light sources (131, 132) capable of emitting light and positioned at a predetermined distance (140) to each other. Furthermore the system comprises at least one detector (150/151, 152) capable of measuring the light emitted. The light emitted by the light sources comprises synchronized light source identification codes. The detector is arranged to determine the position of the vehicle (110) and object (120) on the basis of a phase-difference measurement between the light originating from the individual light sources (131, 132) and a comparison phase. The vehicle (110) may comprise the at least two light sources (131, 132) and the detector (151, 152), while the phase-difference is measured between light reflected from the object (120) and the comparison phase. Alternatively, the vehicle (110) may comprise the at least two light sources (131, 132) while the object (120) comprises the detector (150) and the detector is arranged to obtain the comparison phase from the light received from one of the light sources (131, 132). The object may be a vehicle.

14 Claims, 3 Drawing Sheets

U.S. PATENT DOCUMENTS

| | | | |
|---|---|---|---|
| 6,204,754 B1 * | 3/2001 | Berstis | 340/435 |
| 6,433,856 B1 * | 8/2002 | Yoo | 356/3.01 |
| 6,973,316 B1 * | 12/2005 | Hayakawa | 455/456.1 |
| 7,123,351 B1 | 10/2006 | Schaefer | |
| 7,978,320 B2 * | 7/2011 | Wada | 356/138 |
| 2005/0195383 A1 | 9/2005 | Breed et al. | |

FOREIGN PATENT DOCUMENTS

| | | |
|---|---|---|
| GB | 21631642 A | 6/2004 |
| JP | 02253116 A | 10/1990 |
| JP | 03006418 A | 1/1991 |
| JP | 2001183458 A | 7/2001 |
| JP | 2002236175 A | 8/2002 |
| JP | 2005164482 A | 6/2005 |

* cited by examiner

VEHICLE POSITIONING MEASUREMENT SYSTEM AND METHOD

FIELD OF THE INVENTION

The invention relates to a vehicle positioning measurement system according to the preamble of claim 1. The invention also relates to a vehicle position measurement method according to the preamble of claim 11. Such vehicle positioning measurement systems and methods are used in particular in situations where the determination of the (relative) position and/or distance between a vehicle and an object is desired. Examples of such situations are vehicle-to-vehicle distance measurement or localisation of objects as assistance during parking.

BACKGROUND OF THE INVENTION

U.S. Pat. No. 5,039,217 discloses a car-to-car distance measurement system in which one of the cars comprises a pair of headlamps disposed at a predetermined distance from each other. Each headlamp comprises an optical device having a light projector which projects pulse light having a specific code toward the car in front. Furthermore, the optical device comprises a light receiver capable of receiving the light reflected from the car ahead. Disposing the light projector and the receiver in close proximity to each other allows the respective optical axes of the light projector and the receiver to be considered substantially the same. Moreover, the optical device comprises a driving apparatus for adjusting the angle of projection of the light projector on the basis of a signal from the receiver. The system further has a central processing unit which measures the angle of projection of the pulsed light from the light projector when the light receiver of each of the headlamps detects the reflected light. This allows the determination of the distance between the two cars as well as the angle between the axes of the two cars.

The fact that the prior art system uses rotatably adjustable headlamp units makes it cumbersome to implement. Moreover, as international standards do not allow rear lamps and side markers on vehicles to be adjustably mounted the prior art system does not allow a 360 degree view around the vehicle.

SUMMARY OF THE INVENTION

It is an object of the present invention to provide a vehicle positioning measurement system of the kind set forth, capable of determining the (relative) position of a vehicle and an object using fixed (i.e. unrotatable) light sources. This object is achieved with the system according to the preamble of claim 1 characterized in that the detector is arranged to determine the position of the vehicle relative to the object on the basis of a phase-difference measurement between the light originating from the individual light sources and a comparison phase.

Advantageously, the vehicle positioning measurement system enables the use of fixed headlamps. Furthermore, the inventive system allows position/distance measurements with the vehicle rear and side marker lighting as well, since international standards do not allow these light sources to be adjustably mounted on vehicles. Advantageously, the inventive system allows a 360 degree view for objects around the vehicle, making it highly suitable as a parking assistance.

For the purpose of this invention, the term "position" comprises both distance and orientation. Hence, determining the relative position of two objects includes determining both the distance between them as well as a direction—i.e. the angle of the line interconnecting the objects with respect to a predetermined axis. In other words, position constitutes a vector, distance a mere integer.

In an embodiment the comparison phase is obtained from a reference signal which is synchronized with the light source identification codes. Advantageously, the reference signal defines the modulation frequency of the light allowing the distance and position measurements/calculation to be performed.

In an embodiment the vehicle comprises the at least two light sources and the at least one detector, wherein the at least one detector is positioned at a predetermined distance from the light sources and is arranged to measure the phase-difference between light reflected from the object and the comparison phase. Advantageously, the vehicle comprises the system in a self contained manner allowing the determination of its position relative to several objects (subsequent and or simultaneous in time).

In an embodiment, the vehicle comprises the at least two light sources, the object comprises the at least one detector, and the detector is arranged to obtain the comparison phase from the light received from one of the light sources. Advantageously, this embodiment allows the object to obtain information about its environment. In an embodiment the object is another car, allowing for communicating vehicles with a 360 degree field of view. Advantageously, this improves road safety.

In an embodiment the light sources are arranged to transmit data in addition to the light source identification codes. In an embodiment the data comprises the predetermined distance between the light sources. Advantageously, this allows performing trigonimetrical calculations to determine not only the distance but also the position of the vehicle and object.

In an embodiment the system is arranged to provide the light source identification codes using spread spectrum modulation. In an embodiment the spread spectrum modulation is a CDMA modulation. In an embodiment the spread spectrum modulation is based on On-Off Keying or Bi-Phase modulation. Advantageously, providing the light source identification codes using spread spectrum modulation such as CDMA (code division multiple access) modulation permits transmitting simultaneous signals over a shared portion of the spectrum, while allowing all the signals to have their own specific coding scheme for identification. In addition CDMA coding advantageously provides the normal illumination driving function of the lighting infrastructure in the vehicle, while simultaneously utilizing the identification code modulation according to the invention.

According to a second aspect the invention provides a method for determining the position of a vehicle and an object according to the preamble of claim 11, characterized by determining the position of the vehicle and object on the basis of a phase-difference measurement between the light originating from the individual light sources and a comparison phase.

These and other aspects of the invention will be apparent from and elucidated with reference to the embodiments described hereinafter.

BRIEF DESCRIPTION OF THE DRAWINGS

Further details, features and advantages of the invention are disclosed in the following description of exemplary and preferred embodiments in connection with the drawings.

DETAILED DESCRIPTION OF THE EMBODIMENTS

Figure 1:
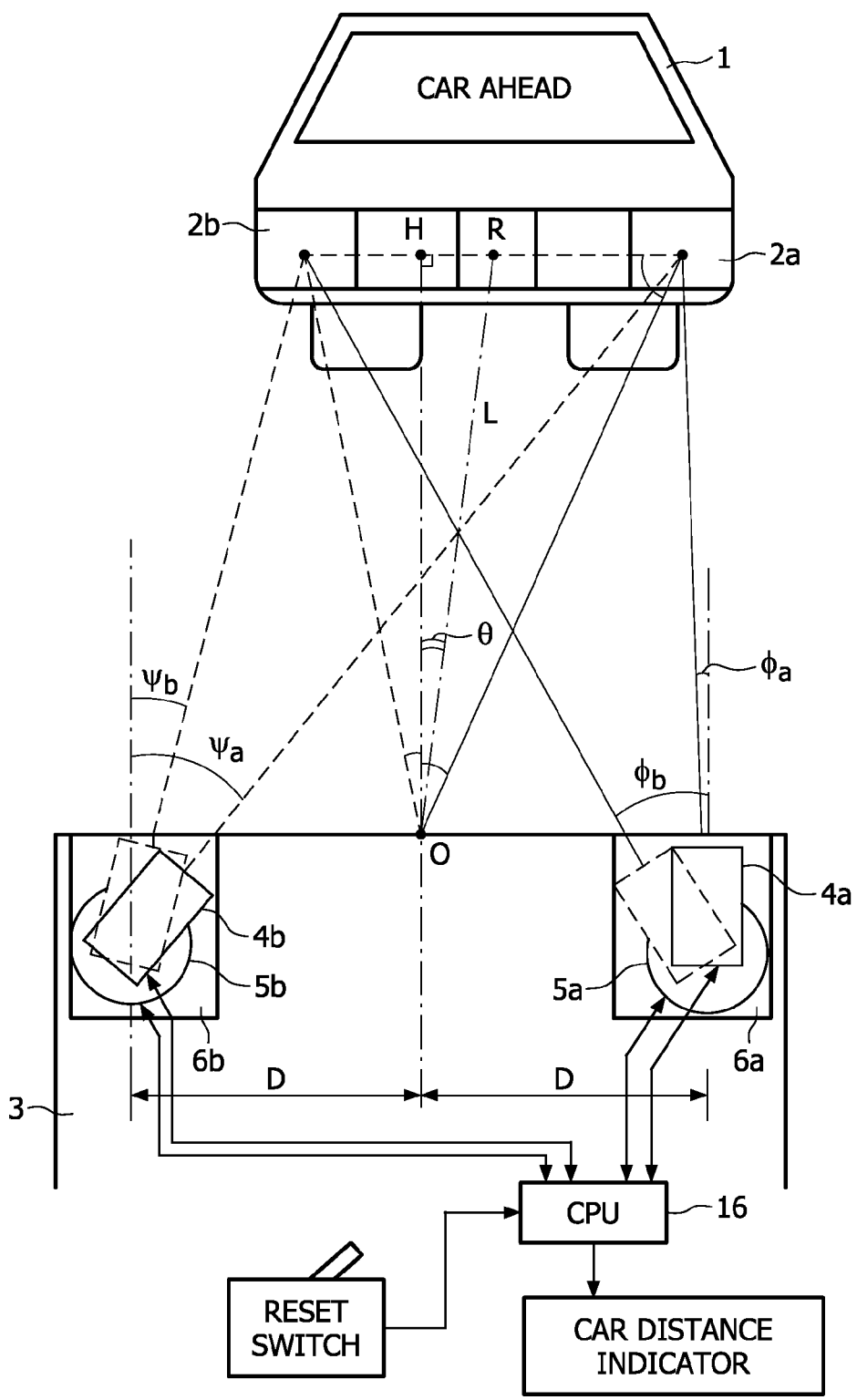
FIG. 1 shows a prior art vehicle distance measurement system

FIG. 1 shows a prior art car 3 to car 1 distance measurement system comprising two head lamps 6a,b each including an optical device 4a,b. The headlamps 6a,b are installed at a distance 2D from each other. The optical devices include a light projector (not shown) for projecting coded light and a light receiver (not shown) for detecting the reflected light from the car 1 ahead. The optical devices 4a,b can be rotatably driven by respective driving systems 5a,b. The light emitted from the headlamps 6a,b reflects from reflectors 2a,b provided on car 1 towards the receivers in the optical devices 4a,b, when the receivers driving systems 5a,b are at the angles Φa, Φb, Ψa, and Ψb. Detecting these angles using CPU 16 allows the determination of the position of the two cars, i.e. the distance L between the cars and the angle θ between the lines RO and HO perpendicular to car 3.

It is clear that the rotatably driven optical devices 4a,b in combination with the driving systems 5a,b in the prior art have severe disadvantages as the automotive industry continuously strives for robust systems, improved fuel efficiency (i.e. lower weight components on board) and quality improving assembly technology. Hence the present invention has as an objective to provide a vehicle positioning measurement system capable of determining the (relative) position of a vehicle and an object without the need of rotateable light sources.

Figure 2:
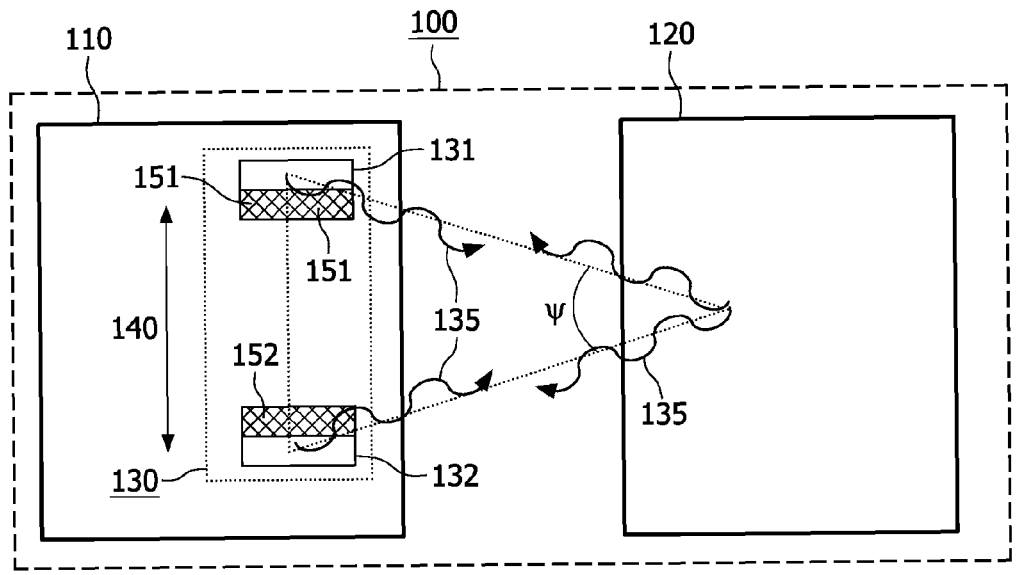
FIG. 2 shows an embodiment of the inventive vehicle position measurement system

FIG. 2 shows an embodiment of the inventive vehicle position measurement system 100. It discloses a vehicle 110 and an object 120. The object may be another vehicle. It may, however, also be another kind of road user (such as a cyclist or a pedestrian) or even a fixed object (such as a tree or a post). International standards prescribe the vehicle 110 to be equipped with a lighting infrastructure 130 comprising at least two light sources 131, 132. These include o.a. front lighting (such as head lamps with a passing beam and a high beam & day time running lights), rear lighting (such as break lights & reverse lights), and turn signals (both at the front, the back and as side markers). Typically GLS/halogen bulbs, HID discharge bulbs or LEDs function as light sources in automotive lighting infrastructures 130. Furthermore, these standards prescribe the light sources 131, 132 to be positioned (within a certain range allowing design some freedom of the vehicle) at a predetermined distance 140 to each other.

Modulating the light sources 131, 132 enables them to transmit light source identification codes 135. Advantageously these codes allow identification of the origin of the emitted light, prevent confusion of the sources and enable the trigonimetrical calculations (see below) for determining the (relative) position of the vehicle 110 and the object 120. Providing the light source identification codes 135 using spread spectrum modulation such as CDMA (code division multiple access) modulation advantageously permits transmitting simultaneous signals over a shared portion of the spectrum, while allowing all the signals to have their own specific coding scheme for identification. In addition CDMA coding advantageously provides the normal illumination driving function of the lighting infrastructure 130 while simultaneously utilizing the identification code modulation according to the invention. In one embodiment the CDMA coding scheme is based on On-Off Keying. On-Off Keying (OOK) modulation is a type of modulation where digital data is represented as the presence or absence of a carrier wave. In its simplest form the presence of a carrier for a specific duration represents a binary '1', and its absence for the same duration represents a binary '0', although in principle any digital encoding scheme may be used. In yet another embodiment the CDMA coding scheme is a generalization of BiPhase (BP) modulation, to allow an arbitrary duty cycle. When the duty cycle equals 50%, Duty Cycle BiPhase (DC-BP) degenerates to BP modulation. More generally, the light sources 131, 132 may transmit data in addition to (or instead of) the light source identification codes 135.

The vehicle positioning measurement system 100 furthermore comprises at least one detector 151, 152. Directly locating the detectors adjacent to the light sources 131, 132 has the advantage of positioning them at essentially the same predetermined distance 140 between the light sources, allowing for simpler trigonimetrical calculations (see below.) Alternatively, the at least one detector 151, 152 may be locating at an appropriate position (to the discretion of the vehicle designer) away from one or more of the light sources 131, 132 at the cost of (slightly) more complicated trigonimetrical calculations. Advantageously, performing the trigonimetrical calculations may be done with knowledge on the position of the detector(s) 151, 152 relative to the light sources or on the location of the light sources 131, 132 (f.i. the predetermined distance 140). In an embodiment, this knowledge is based on information comprised in the data transmitted by the light sources.

Advantageously, a reference clock signal synchronizes the modulation of the light sources 131, 132 and the detector 151, 152. This reference clock signal can be made in any appropriate way as known to a person skilled I the art. For instance, it can be made by a reference signal generator located in the vehicle 110. As an example, a dedicated wire may be used to feed the reference clock signal to each light source and detector. Or the reference signal is sent over the power lines. Alternatively, the clock signal is transmitted wirelessly to the light sources and detectors. Alternatively yet, a virtual device representing a common clock makes the reference signal. As yet another example, the reference signal may be obtained from the satellites of the global positioning system by a GPS receiver.

The inventive method determines the position of the vehicle 110 and the object 120 on the basis of a phase-difference measurement between the light originating from the individual light sources 131, 132 and a comparison phase. Advantageously, the inventive method excludes the need for rotatable/moveable/adjustable light sources.

Figure 3:
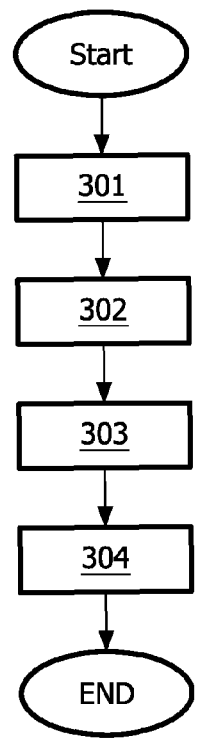
FIG. 3 shows a flow chart illustrating embodiments of the inventive vehicle position measurement method

FIG. 3 show the inventive determination process. Assuming the modulated light (including the light source identification codes 135) emitted has reached the detector(s) 151, 152 after reflection from the object 120, the method starts at step 301 in which the individual light sources 131, 132 are identified.

Step 302 compares the phases of the code signals 135 with a comparison phase. Advantageously, the comparison phase is derived from the reference clock signal synchronizing the light sources 131, 132. Alternatively, in an embodiment the comparison phase is derived from the light received from one of the light sources. Knowing the reference clock signal frequency $f_{mod}$, the method measures the phase angle $\Phi$ between the received modulate light and the comparison phase. This phase angle can be related to the time delay $t_d$ between emission and reception, according to:

$$t_d = \frac{\phi}{2\pi f_{mod}}$$

In step 303 the distance d between the vehicle 110 and object 120 (assuming in the simplest case that light source and detector are positioned at the edge of the vehicle—otherwise corrections have to be implemented relating to the distance of the light source/detector to the edge of the vehicle) can than be calculated according to (with c the speed of light):

$$d = \frac{ct_d}{2} = \frac{c\phi}{4\pi f_{mod}}$$

Although for a three dimensional position the light of at least three different light sources 131, 132 has to reach the at least one detector 151, 152, a person skilled in the art will readably understand that the determination of vehicle 110 to object 120 position essentially constitutes a two dimensional problem. Hence, the inventive method only needs at least two light sources 131, 132 for the position determination. Advantageously, the accuracy of the determined position will improve when using more light sources. Once at least two distances have been determined using modulated light originating from two individual light sources 131, 132, standard trigonimetrical calculations allow for the determination of the angle $\Psi$ (see FIG. 2)—through the use of o.a. the predetermined distance 140 between the light sources—and hence the relative position of the vehicle 110 and object 120 in step 304. Advantageously, once the position of the vehicle 110 and object 120 have been determined, information relating to the position may be transmitted to the driver of the vehicle 110 in an appropriate way (visually, audibly, etc) known in the art.

Figure 4:
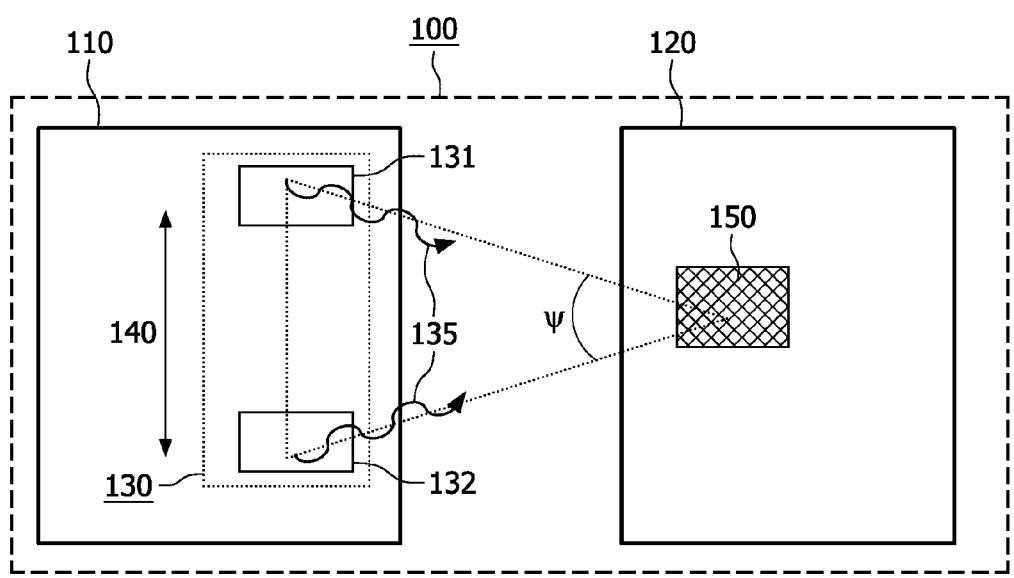
FIG. 4 shows another embodiment of the inventive vehicle position measurement system.

In another embodiment of the vehicle positioning measurement system 100 as indicated in FIG. 4 the vehicle 110 comprises the at least two light sources 131, 132, while the object 120 comprises the at least one detector 150. Advantageously, for instance in case the object 120 is another vehicle, this embodiment of the system allows for communicating vehicles. Here the detector 150 measures the light emitted (comprising the light source identification codes 135 and the data) directly, in stead of indirectly (i.e. after reflection). The detector 150 derives the comparison phase from the light received from one of the at least two light sources 131, 132. The comparison phase may for example be derived from the light modulation frequency it self. Alternatively, the modulated light may comprise data relating to the comparison phase. For example, the data comprises information relating to the GPS signal received in the vehicle 110. Advantageously, the data transmitted by the light sources comprises information on the predetermined distance 140 between the light sources 131, 132, allowing the vehicle/object position to be calculated at the detector 150 in object 120. Advantageously, in case object 120 is another car, its driver may be warned about the position of vehicle 110 approaching him for example from the back or sideways. Alternatively, the object/car 120 may be arranged to signal the driver of the vehicle 110 on their relative position and that he for example should keep his distance, advantageously improving road safety. Advantageously, modulating data into the light emitted by both their light infrastructures 130, allows two vehicles to communicate using an appropriate communication protocol. As an example, performing the inventive positioning measurement on both vehicle (one vehicle using front lighting light sources, the other using rear lighting) and comparing the results through data communication superimposed on the light emitted improves accuracy and ultimately road safety.

Advantageously, the vehicle 110 position may be determined relative to objects 120 along the road comprised in a "traffic jam detection & prediction system". Continuously determining the positions of vehicles occupying a road allows the traffic jam detection & prediction system to calculate the expected vehicle density and hence the risk of a developing traffic jam. In an embodiment the objects 120 of the "traffic jam detection & prediction system" comprise light sources capable of transmitting data embedded in their emitted light. Advantageously, the vehicles 110 obtain feedback from the system on the road congestion to be expected ahead.

Advantageously, the vehicle 110 position may be determined relative to objects 120 along the road comprised in a "stolen vehicle detection & tracking system". The objects 120 of the stolen vehicle detection & tracking system then comprise a detector 150. Advantageously, every vehicle 110 comprises a unique identification code which may be embedded in the data transmitted by the light sources 131, 132 of the vehicle infrastructure 130. The unique vehicle ID allows the stolen vehicle detection system to identify and track a stolen vehicle along the road infrastructure of a geographical area. Vehicle identification may be implemented in a number of ways. Advantageously, the vehicle ID may comprise a brand and type code, for which 10 bits may be enough, followed by e.g. the production year (7 bits are enough) and a serial number per year (20 bits). This embodiment implies a vehicle ID of about 40 bits. Such data may be communicated at bit rates low enough to be accommodated in the light emitted by e.g. phosphor coated LEDs. Here the decay time of the phosphor emission essentially determines the maximum bit rate. Practical phosphors provide sufficiently short (1 μs or faster) decay times, allowing bit rates up to the MHz range.

Although the invention has been elucidated with reference to the embodiments described above, it will be evident that other embodiments may be alternatively used to achieve the same object. The scope of the invention is therefore not limited to the embodiments described above, but can also be applied to any other positioning measurement system which makes use of the lighting infrastructure of a construction (such as a vehicle). For example, in stead of a vehicle the construction may be any object comprising an illuminating lighting infrastructure. For example, the object 120 may be comprised in the road infrastructure, i.e. the object may be luminaire illuminating the road or another road infrastructure element such as an overhead sign.

Summarizing, a vehicle position measurement system 100 and method to determine the (relative) position of a vehicle 110 and an object 120 are proposed. The system comprises at least two light sources 131, 132 capable of emitting light and positioned at a predetermined distance 140 to each other. Furthermore the system comprises at least one detector 150/151, 152 capable of measuring the light emitted. The light emitted by the light sources comprises synchronized light source identification codes. The detector is arranged to determine the position of the vehicle 110 and object 120 on the basis of a phase-difference measurement between the light originating from the individual light sources 131, 132 and a comparison phase. The vehicle 110 may comprise the at least two light sources 131, 132 and the at least one detector 151, 152, while the phase-difference is measured between light reflected from the object 120 and the comparison phase. Alternatively, the vehicle 110 may comprise the at least two light sources 131, 132 while the object 120 comprises the detector 150 and the detector is arranged to obtain the comparison phase from the light received from one of the light sources 131, 132. The object may be a vehicle.

The invention claimed is:

1. A vehicle positioning measurement system for determining positioning of a vehicle relative to an object, the system comprising:
   at least two light sources for emitting light comprising synchronized light source identification codes and the light sources being positioned at a predetermined distance to each other,
   at least one detector for measuring the light emitted by the light sources, the detector being configured to determine a position of the vehicle relative to the object at least on the basis of a phase-difference measurement between the light emitted by the light sources and a comparison phase.

2. The vehicle positioning measurement system according to claim 1, wherein the comparison phase is obtained from a reference signal synchronized with the light source identification codes.

3. The vehicle positioning measurement system according to claim 1, wherein the vehicle includes the at least two light sources and the at least one detector, wherein the at least one detector is positioned at a predetermined distance from the light sources and is arranged to measure the phase-difference between light reflected from the object and the comparison phase.

4. The vehicle positioning measurement system according to claim 1, wherein the vehicle includes the at least two light sources, the object comprises the at least one detector, and the detector is configured to obtain the comparison phase from the light received from one of the light sources.

5. The vehicle positioning measurement system according to claim 1, wherein the light sources are configured to transmit data in addition to the light source identification codes.

6. The vehicle positioning measurement system according to claim 5, wherein the data comprises the predetermined distance between the light sources.

7. The vehicle positioning measurement system according to claim 1, wherein the object is another vehicle.

8. The vehicle positioning measurement system according to claim 1 wherein the system is configured to provide the light source identification codes using spread spectrum modulation.

9. The vehicle positioning measurement system according to claim 8, wherein the spread spectrum modulation is a code division multiple access (CDMA) modulation.

10. The vehicle positioning measurement system according to claim 8, wherein the spread spectrum modulation is based on On-Off Keying or Bi-Phase modulation.

11. A method for determining the position of a vehicle and an object comprising the steps of
    emitting light comprising synchronized light source identification codes by at least two light sources disposed at a predetermined distance to each other,
    measuring the light emitted by the light sources by at least one detector, and
    determining the relative position of the vehicle and object on the basis of a phase-difference measurement between the light originating from the light sources and a comparison phase.

12. The method according to claim 11, further comprising the step of obtaining the comparison phase from a reference signal which is synchronized with the light source identification codes.

13. The method according to claim 11, wherein the at least two light sources and the detector are disposed at the vehicle, and the phase-difference between light reflected from the object and the comparison phase is measured for determining the relative position of the vehicle and the object.

14. A method according to claim 11, wherein the at least two light sources are disposed at the vehicle, the detector is disposed at the object and wherein the comparison phase is obtained from the light received from one of the light sources.

* * * * *